US006989941B2

(12) United States Patent
Tomioka (10) Patent No.: US 6,989,941 B2
(45) Date of Patent: Jan. 24, 2006

(54) TWO-GROUP ZOOM LENS

(75) Inventor: Ukyo Tomioka, Saitama (JP)

(73) Assignee: Fujinon Corporation, Saitama (JP)

( * ) Notice: Subject to any disclaimer, the term of this patent is extended or adjusted under 35 U.S.C. 154(b) by 66 days.

(21) Appl. No.: 10/951,628

(22) Filed: Sep. 29, 2004

(65) Prior Publication Data

US 2005/0078380 A1      Apr. 14, 2005

(30) Foreign Application Priority Data

Oct. 8, 2003  (JP) .............................. 2003-349184

(51) Int. Cl.
*G02B 15/14* (2006.01)

(52) U.S. Cl. ...................... 359/680; 359/682; 359/691; 359/717; 359/708; 359/689; 359/686; 359/793; 359/754

(58) Field of Classification Search ................ 359/680, 359/682, 691, 717, 708, 689, 686, 793, 754
See application file for complete search history.

(56) References Cited

U.S. PATENT DOCUMENTS 6,762,887 B2 * 7/2004 Tomioka ...................... 359/691
2002/0126393 A1   9/2002 Nasu et al.

FOREIGN PATENT DOCUMENTS

JP   2002-196235   7/2002
JP   2002-244038   8/2002

* cited by examiner

*Primary Examiner*—Evelyn A. Lester
(74) *Attorney, Agent, or Firm*—Arnold International; Jon W. Henry; Bruce Y. Arnold (57) ABSTRACT

A comparatively low f-number, compact two-group zoom lens that corrects aberrations in the visible and the near-infrared regions includes, in order from the object side, a first lens group of negative refractive power and a second lens group of positive refractive power. The first lens group includes three lens components that are lens elements of negative, negative, negative, and positive refractive power, respectively, in order from the object side. The second lens group includes four lens components that are lens elements of positive, positive, negative, and positive refractive power, respectively, in order from the object side. Aspheric surfaces are disclosed. Certain conditions relating to the focal lengths of the two lens groups, the indexes of refraction, and Abbe numbers of various lens elements are satisfied to control aberrations in both the visible and the near-infrared regions.

20 Claims, 8 Drawing Sheets

Fig. 1

Spherical Aberration
Fig. 2A

Astigmatism
Fig. 2B

Distortion
Fig. 2C

Spherical Aberration
Fig. 3A

Astigmatism
Fig. 3B

Distortion
Fig. 3C

Fig. 4

Spherical Aberration
Fig. 5A

Astigmatism
Fig. 5B

Distortion
Fig. 5C

Spherical Aberration
Fig. 6A

Astigmatism
Fig. 6B

Distortion
Fig. 6C

Fig. 7

Spherical Aberration
Fig. 8A

Astigmatism
Fig. 8B

Distortion
Fig. 8C

Spherical Aberration
Fig. 9A

Astigmatism
Fig. 9B

Distortion
Fig. 9C

Fig. 10

Spherical Aberration
Fig. 11A

Astigmatism
Fig. 11B

Distortion
Fig. 11C

Spherical Aberration
Fig. 12A

Astigmatism
Fig. 12B

Distortion
Fig. 12C

TWO-GROUP ZOOM LENS

BACKGROUND OF THE INVENTION

In monitor cameras, such as closed circuit television cameras (CCTVs) that are used for surveillance, a lens system that works effectively both during the day and at night has been desired. Particularly, outdoor monitor cameras using visible light during the day and near-infrared light at night for capturing images are useful. Therefore, lens systems with good performance in both the visible light region and the near-infrared region are desirable.

Conventional lens systems designed for visible light produce chromatic aberration in the near-infrared range. Therefore, near-infrared images captured at night are out of focus. Monitor camera lens systems need to have chromatic aberration corrected in both the visible and near-infrared light regions.

Japanese Laid-Open Patent Application 2002-207166 describes a conventional zoom lens for correcting chromatic aberrations in the visible light region and in the near-infrared region. The zoom lens described in Japanese Laid-Open Patent Application 2002-207166 is a two-group zoom lens that includes an object-side lens group having negative refractive power and an image-side lens group having positive refractive power. In one embodiment, the object-side lens group includes two lens components and three lens elements and the image-side lens group includes five lens components and six lens elements.

As described above, monitor camera lens systems should have chromatic aberration favorably corrected in both the visible light region and the near-infrared region. Other requirements for monitor camera lens systems include providing a bright image even in low illumination by reason of the lens having a low f-number, and being compact. It is desirable to develop a lens system that satisfies these requirements.

BRIEF SUMMARY OF THE INVENTION

The present invention relates to a compact zoom lens that favorably corrects chromatic aberration in both the visible light region and the near-infrared region and provides comparatively bright imaging by the lens having a relatively low f-number. Additionally, the present invention relates to such a compact zoom lens that is particularly suitable for monitoring in both the visible and near-infrared light regions.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
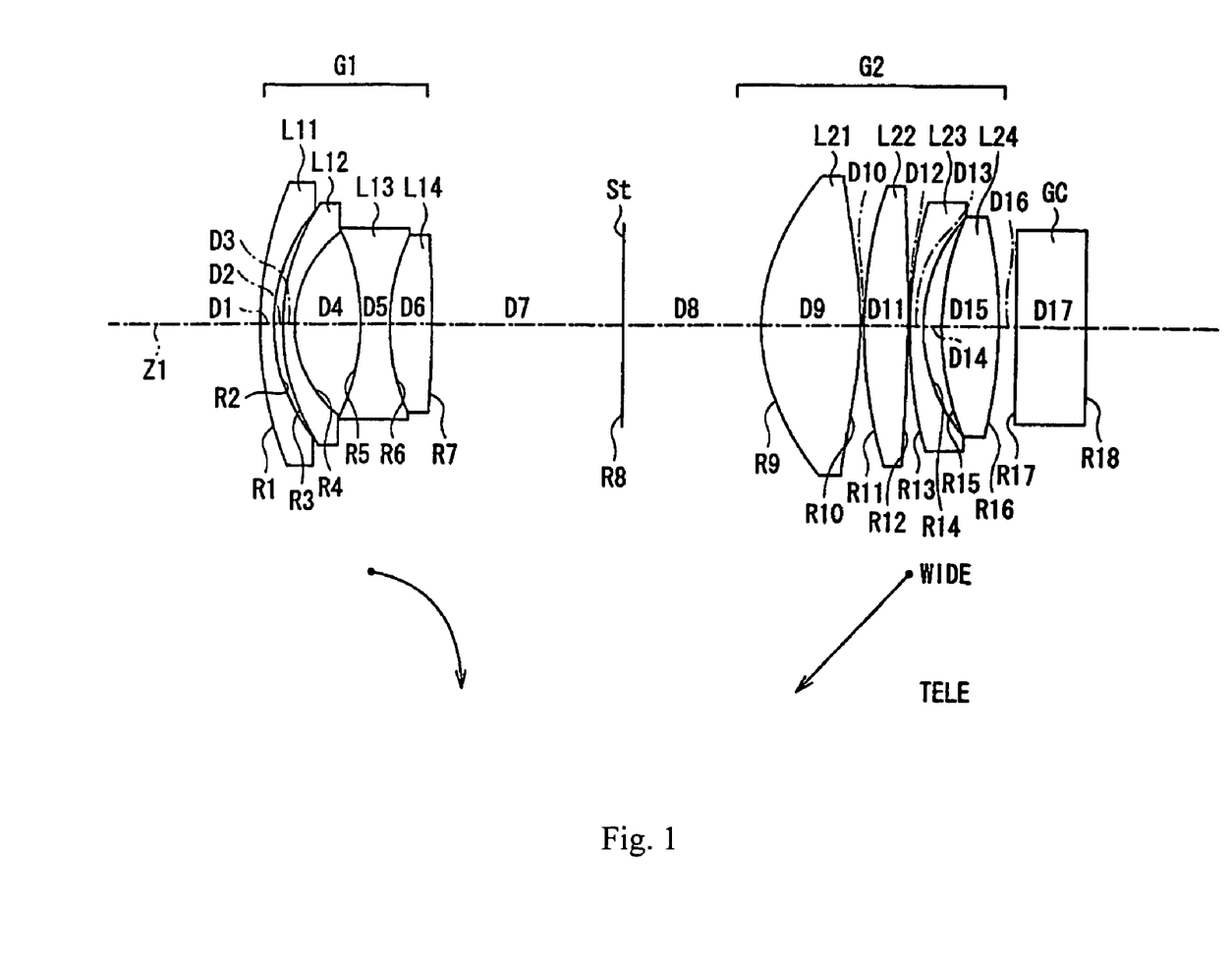
FIG. 1 shows a cross-sectional view of Embodiment 1-1 of the zoom lens of the present invention at the wide-angle end.

A general description of the two-group zoom lens of the present invention that pertains to all four embodiments of the invention will first be described with reference to FIG. 1 that shows Embodiment 1-1. In FIG. 1, lens elements are referenced by the letter L followed by a number denoting their order from the object side of the zoom lens along the optical axis Z1, from L11 to L14 and from L21 to L24. Similarly, radii of curvature of the surfaces of the various optical elements, including the lens surfaces, are referenced by the letter R followed by a number denoting their order from the object side of the zoom lens, from R1 to R18. The on-axis surface spacings along the optical axis Z1 of the various optical surfaces are referenced by the letter D followed by a number denoting their order from the object side of the zoom lens, from D1 to D17. In the same manner, the two lens groups are labeled G1 and G2 in order from the object side of the zoom lens and the lens components belonging to each lens group are indicated by the brackets adjacent the labels G1 and G2.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is herein defined as an assembly of one or more lens components in optical series and with no intervening lens components along an optical axis that during zooming is movable as a single unit relative to another lens component or other lens components.

As shown in FIG. 1, a diaphragm stop St that controls the amount of light that passes through the zoom lens is included between the lens groups G1 and G2. Also as shown in FIG. 1, a cover glass GC is arranged on the image side of the second lens group G2.

The zoom lens is designed for use in both the visible light region and the near-infrared region and is particularly suited for mounting in a monitor camera for use both during the day and at night. As shown in FIG. 1, the two-group zoom lens of the present invention includes, in order from the object side, a first lens group G1 having negative refractive power and a second lens group G2 having positive refractive power.

An image pickup element (not shown in the drawings), such as a CCD (Charge-Coupled Device) or a CMOS (Complementary Metal-Oxide Semiconductor), is arranged at an image plane (not shown in the drawings) on the image side of the cover glass GC. Various other optical elements may also be arranged between the second lens group G2 and the image plane.

The zoom lens is a two-group zoom lens. The two-group zoom lens zooms from the wide-angle end to the telephoto end by moving the second lens group G2 toward the object side along the optical axis Z1 in order to change the focal length of the zoom lens, and compensates for movement of the image plane caused by movement of the second lens group G2 by moving the first lens group G1 toward the image side during zooming from the wide-angle end to the telephoto end of the zoom range. Downward arrows at the bottom of FIG. 1 show the directions of movement along the optical axis Z1 of the first lens group GI and the second lens group G2 when zooming from the wide-angle end to the telephoto end, as indicated by the symbols "WIDE" and "TELE", respectively, in FIG. 1. The first lens group G1 also functions as a focusing lens group.

The zoom lens of the present invention satisfies the following conditions:

$$0.5 < |f1/f2| < 0.8 \qquad \text{Condition (1)}$$

$$2.6 < str/z < 2.9 \qquad \text{Condition (2)}$$

where
 $f1$ is the focal length of the first lens group G1,
 $f2$ is the focal length of the second lens group G2,
 str is the distance that the second lens group G2 moves along the optical axis during zooming from the wide-angle end to the telephoto end, and
 z is the zoom ratio of the zoom lens, defined as the focal length at the telephoto end divided by the focal length at the wide-angle end.

The distance str that the second lens group G2 moves along the optical axis during zooming from the wide-angle end to the telephoto end is known is herein termed the stroke of the second lens group G2.

Aberrations are readily corrected and the zoom lens may be kept compact by satisfying Condition (1). If the value of Condition (1) does not satisfy the upper limit of Condition (1), the refractive power of the first lens group G1 becomes too weak and the first lens group must be moved too far during zooming so that the zoom lens cannot be made compact. If the value of Condition (1) does not satisfy the lower limit of Condition (1), the refractive power of the first lens group becomes too strong, and sufficient correction of spherical aberration at the telephoto end that is required for a low f-number lens cannot be achieved.

If the value of Condition (2) does not satisfy the upper limit of Condition (2), the stroke of the second lens group G2 is increased, which hampers achieving a compact design. If the value of Condition (2) does not satisfy the lower limit of Condition (2), it is very difficult to correct spherical aberration and coma aberration, especially at the wide-angle end.

The first lens group G1 includes three lens components and four lens elements, in order from the object side, as follows: a first lens element L11 having negative refractive power; a second lens element L12 having negative refractive power; and a lens component that includes, in order from the object side, a third lens element L13 having negative refractive power and a fourth lens element L14 having positive refractive power that form a doublet.

In the first lens group G1, the first lens element L11 and the second lens element L12 are preferably meniscus lens elements with their convex surfaces on the object side, the third lens element L13 is preferably a biconcave lens element, and the fourth lens element L14 is, for example, a meniscus lens element with its convex surface on the object side.

Preferably, the second lens group G2 includes four lens components and four lens elements, namely—in order from the object side, a first lens element L21 having positive refractive power and at least one aspheric surface, a second lens element L22 having positive refractive power, a third lens element L23 having negative refractive power, and a fourth lens element L24 having positive refractive power.

In the second lens group G2, the first lens element L21 is, for example, biconvex near the optical axis, the second lens element L22 and the fourth lens element L24 are, for example, biconvex lens elements, and the third lens element L23 is preferably a lens element having negative refractive power and a meniscus shape with its convex surface on the object side.

Preferably, this zoom lens satisfies the following conditions:

$$N_{dL14} > 1.83 \qquad \text{Condition (3)}$$

$$N_{dL23} > 1.83 \qquad \text{Condition (4)}$$

where
 $N_{dL14}$ is the index of refraction at the d-line (587.6 nm) of the fourth lens element L14 of the first lens group G1, and
 $N_{dL23}$ is the index of refraction at the d-line (587.6 nm) of the third lens element L23 of the second lens group G2.

By satisfying Conditions (3) and (4), the lens elements L14 and L23 may have gently curved surfaces (i.e., large radii of curvature), which makes it easier to achieve a compact zoom lens design. Particularly when the lens element L23 satisfies Condition (4) and has negative refractive power and a meniscus shape with its convex surface on the object side, it is easier to achieve a compact design. If the lower limit of Conditions (3) and (4) is not satisfied, it is very difficult to achieve a compact design.

Additionally, in order to improve imaging, at least one of the first lens element L21 and the second lens element L22 of the second lens group G2 has at least one aspheric surface, which makes it much easier to correct the spherical aberration that occurs with a low f-number lens.

The lens surfaces that are aspheric are defined using the following equation:

$$Z = [(C \cdot Y^2)/\{1 + (1 - K \cdot C^2 \cdot Y^2)^{1/2}\}] + \Sigma(A_i \cdot Y^i) \qquad \text{Equation (A)}$$

where
 Z is the length (in mm) of a line drawn from a point on the aspheric lens surface at a distance Y from the optical axis to the tangential plane of the aspheric surface vertex, C is the curvature (=1/the radius of curvature, R in mm) of the aspheric lens surface on the optical axis, Y is the distance (in mm) from the optical axis, K is the eccentricity, and $A_i$ is the ith aspheric coefficient, and the summation extends over i.

In embodiments of the invention disclosed below, only aspheric coefficients $A_3$–$A_{10}$ are non-zero.

Furthermore, in the zoom lens of the present invention, preferably the Abbe number at the d-line (587.6 nm) of at least one of the first lens element L21 and the second lens element L22 of the second lens group G2 exceeds 60, as will be discussed below with regard to particular embodiments of the invention and Conditions (5-1) and (5-2).

In the zoom lens of the present invention, the second lens group G2 is moved along the optical axis for zooming, performing a variating function, and the first lens group G1 is moved along the optical axis for correcting the image plane shift that occurs during zooming, performing a compensating function. For focusing, the first lens group G1 is moved along the optical axis.

In the zoom lens of the present invention, the first lens group G1 includes three lens components and four lens elements, which make it easier to correct aberrations, particularly lateral color and spherical aberration at the telephoto end while achieving a compact design, compared to, for example, a first lens group having only two lens components and only three lens elements. Also, the lens elements L13 and L14 that form a doublet make it easier to correct chromatic aberrations.

Furthermore, by providing two lens elements, each of which has negative refractive power and a meniscus shape with its convex surface on the object side of the zoom lens, it is easier to correct spherical aberration at the telephoto end.

The zoom lens of the present invention provides satisfactory correction of aberrations over the visible to near-infrared range, a compact design, and a fast lens (i.e., one having a low f-number), and is suitable for a monitor camera according to specific requirements, such as good performance from high to low illumination, the ability to change from visible to near-infrared light without having to refocus the zoom lens, and is suitable for specific configurations of convenient lens systems, as set out, for example, in the specific embodiments below.

Embodiments 1-1, 1-2, 2-1, and 2-2 of the present invention will now be individually described with further reference to the drawings.

EMBODIMENT 1-1

FIG. 1 shows a cross-sectional view of Embodiment 1-1 of the zoom lens of the present invention at the wide-angle end. In this zoom lens, spherical aberration that occurs with large a low f-number lens is easily corrected by the first lens element L21 of the second lens group G2 including an aspheric surface, in particular by both lens surfaces being aspheric. Because it is the first lens element L21 of the second lens group G2 that includes an aspheric surface, it is easier to keep sensitivity to eccentricity low.

Embodiment 1-1 preferably satisfies the following condition concerning the Abbe number at the d-line (587.6 nm) of the first lens element L21 the second lens group G2:

$$v_{dL21} > 60 \quad \text{Condition (5-1)}$$

where $v_{dL21}$ is the Abbe number at the d-line (587.6 nm) of the first lens element L21 of the second lens group G2.

If an aspheric lens element L21 that satisfies Condition (5-1) is properly selected, axial chromatic aberration over the visible to near-infrared range is satisfactorily corrected. Therefore, a lens suitable for both visible and near-infrared light regions can be easily obtained. If the value of Condition (5-1) does not satisfy the lower limit of Condition (5-1), it is very difficult to correct chromatic aberration over the visible to near-infrared regions.

Table 1 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 1-1.

TABLE 1

| # | R | D | $N_d$ | $v_d$ |
|---|---|---|---|---|
| 1 | 18.496 | 0.800 | 1.83481 | 42.7 |
| 2 | 9.039 | 0.509 | | |
| 3 | 10.872 | 0.700 | 1.83400 | 37.2 |
| 4 | 5.868 | 3.896 | | |
| 5 | −10.834 | 1.692 | 1.69895 | 30.1 |
| 6 | 10.834 | 2.465 | 1.92286 | 18.9 |
| 7 | −57.771 | D7 (variable) | | |
| 8 | ∞ (stop) | D8 (variable) | | |
| 9* | 8.792 | 5.711 | 1.49700 | 81.5 |
| 10* | −19.614 | 0.202 | | |
| 11 | 23.005 | 2.552 | 1.51633 | 64.1 |
| 12 | −101.870 | 0.100 | | |
| 13 | 21.774 | 0.800 | 1.92286 | 18.9 |
| 14 | 8.250 | 1.089 | | |
| 15 | 13.755 | 3.267 | 1.69680 | 55.5 |
| 16 | −24.188 | D16 (variable) | | |
| 17 | ∞ | 4.000 | 1.51633 | 64.1 |
| 18 | ∞ | | | |

The surfaces with a * to the right of the surface number in Table 1 are aspheric lens surfaces, and the aspheric surface shape is expressed by Equation (A) above. As indicated in Table 1, both surfaces of the first lens element L21 of the second lens group G2 are aspheric.

Table 2 below lists the values of the constant K and the aspherical coefficients $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_3$ | $A_4$ | $A_5$ | $A_6$ |
|---|---|---|---|---|---|
| 9 | 0.7150124 | 0.4558098E−3 | −0.7633337E−3 | 0.1507031E−3 | −0.7326967E−5 |
| 10 | 2.1514689 | 0.5138096E−3 | −0.3482968E−3 | 0.1279468E−3 | 0.1208003E−4 |

TABLE 2-continued

| # | $A_7$ | $A_8$ | $A_9$ | $A_{10}$ |
|---|---|---|---|---|
| 9 | −0.1490101E−5 | −0.1152130E−6 | 0.6071938E−7 | −0.3926108E−8 |
| 10 | −0.8305275E−5 | 0.1064241E−5 | −0.3932436E−7 | −0.5343759E−9 |

In the zoom lens of Embodiment 1-1, both the first lens group G1 and the second lens group G2 move during zooming. Therefore, the on-axis spacings D7, D8, and D16 change with zooming. With zooming, the focal length f, the f-number $F_{NO}$, and the half-field angle ω of the zoom lens also change. Table 3 below lists the values of the focal length f (in mm), the f-number $F_{NO}$, the half-field angle ω (in degrees), and the variables D7, D8, and D16 (in mm) at the wide-angle end (f=2.95 mm) and at the telephoto end (f=7.95 mm) when the zoom lens is focused at infinity.

TABLE 3

| f | $F_{NO}$ | ω | D7 | D8 | D16 |
|---|---|---|---|---|---|
| 2.95 | 0.95 | 62 | 10.98 | 8.04 | 1.00 |
| 7.95 | 1.89 | 22 | 1.90 | 0.72 | 8.32 |

The zoom lens of Embodiment 1-1 of the present invention satisfies Conditions (1)–(4) and Condition (5-1) above as set forth in Table 4 below.

TABLE 4

| Condition No. | Condition | Value |
|---|---|---|
| (1) | 0.5 < |f1/f2| < 0.8 | 0.684 |
| (2) | 2.6 < str/z < 2.9 | 2.711 |
| (3) | $N_{dL14}$ > 1.83 | 1.923 |
| (4) | $N_{dL23}$ > 1.83 | 1.923 |
| (5-1) | $v_{dL21}$ > 60 | 81.5 |

Figure 2A:
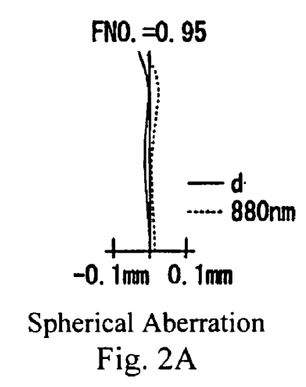
FIGS. 2A–2C show aberrations of Embodiment 1-1 of the zoom lens of the present invention at the wide-angle end.
Figure 2B:
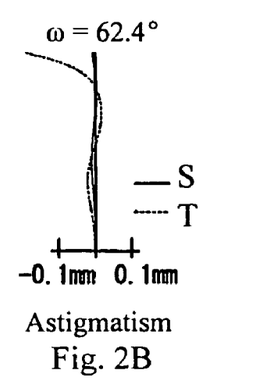
Figure 2C:
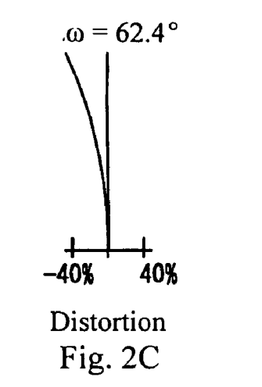
Figure 3A:
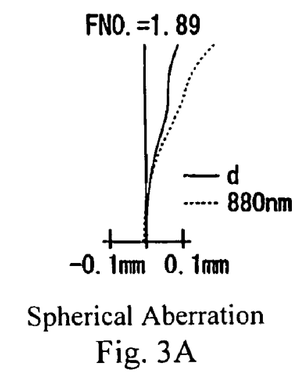
FIGS. 3A–3C show aberrations of Embodiment 1-1 of the zoom lens of the present invention at the telephoto end.
Figure 3B:
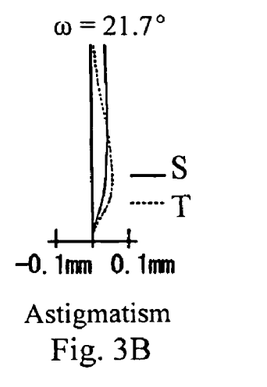
Figure 3C:
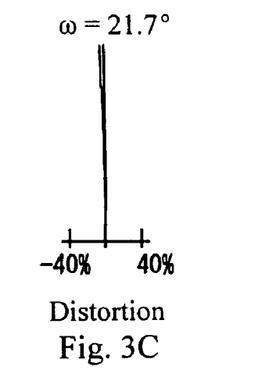

FIGS. 2A–2C show the spherical aberration, astigmatism, and distortion, respectively, of the zoom lens of Embodiment 1-1 at the wide-angle end. FIGS. 3A–3C show the spherical aberration, astigmatism, and distortion, respectively, of the zoom lens of Embodiment 1-1 at the telephoto end. In FIGS. 2A and 3A, the spherical aberration is shown for the wavelengths 587.6 nm (the d-line) and 880 nm. In FIGS. 2B, 2C, 3B, and 3C, ω is the half-field angle. In FIGS. 2B and 3B, the astigmatism is shown for the sagittal image surface S and the tangential image surface T. In FIGS. 2C and 3C, distortion is measured at 587.6 nm (the d-line). As is apparent from these figures, the various aberrations of Embodiment 1-1 are favorably corrected over the entire range of zoom in both the visible light and near-infrared regions despite the compact zoom lens having a relatively low f-number $F_{NO}$.

EMBODIMENT 1-2

Figure 4:
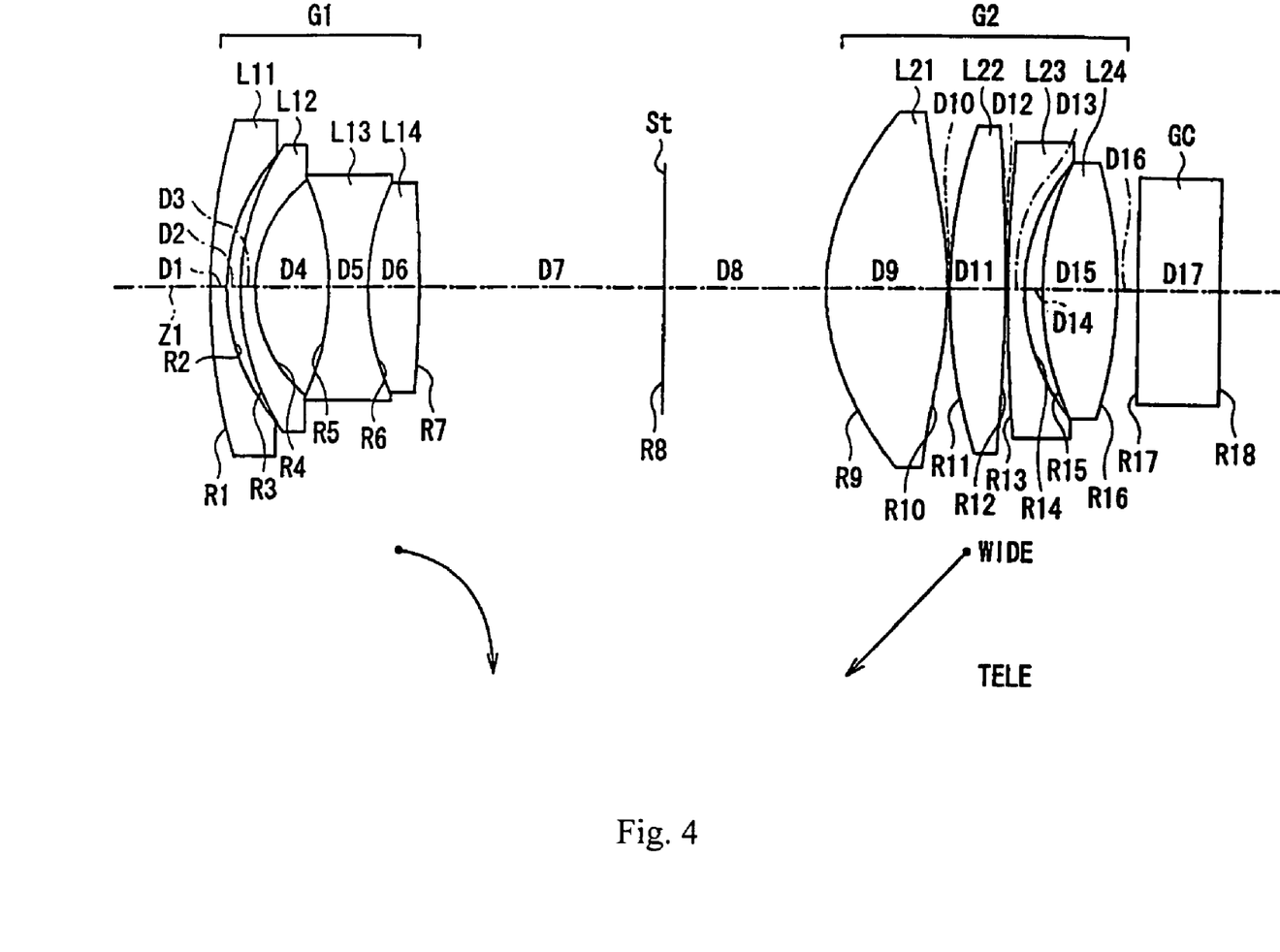
FIG. 4 shows a cross-sectional view of Embodiment 1-2 of the zoom lens of the present invention at the wide-angle end.

FIG. 4 shows a cross-sectional view of Embodiment 1-2 of the zoom lens of the present invention at the wide-angle end. Embodiment 1-2 is very similar to Embodiment 1-1 and therefore only the differences between Embodiment 1-2 and Embodiment 1-1 will be explained. Embodiment 1-2 differs from Embodiment 1-1 in its lens element configuration such as different radii of curvature of the lens surfaces, different eccentricities and aspheric coefficients of the aspheric lens surfaces, some different optical element surface spacings, some different refractive indexes, and some different Abbe numbers of the optical materials of the lens elements.

Table 5 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 1-2.

TABLE 5

| # | R | D | $N_d$ | $v_d$ |
|---|---|---|---|---|
| 1 | 24.710 | 0.800 | 1.81600 | 46.6 |
| 2 | 8.753 | 0.681 | | |
| 3 | 11.201 | 0.700 | 1.80400 | 46.6 |
| 4 | 6.077 | 3.590 | | |
| 5 | −11.687 | 1.903 | 1.62004 | 36.3 |
| 6 | 10.444 | 2.565 | 1.84666 | 23.8 |
| 7 | −60.210 | D7 (variable) | | |
| 8 | ∞ (stop) | D8 (variable) | | |
| 9* | 9.003 | 5.857 | 1.49700 | 81.5 |
| 10* | −16.549 | 0.100 | | |
| 11 | 21.845 | 2.711 | 1.58913 | 61.2 |
| 12 | −76.561 | 0.100 | | |
| 13 | 66.787 | 0.800 | 1.84666 | 23.8 |
| 14 | 8.383 | 0.882 | | |
| 15 | 12.603 | 3.677 | 1.62041 | 60.3 |
| 16 | −18.091 | D16 (variable) | | |
| 17 | ∞ | 4.000 | 1.51633 | 64.1 |
| 18 | ∞ | | | |

The surfaces with a * to the right of the surface number in Table 5 are aspheric lens surfaces, and the aspheric surface shape is expressed by Equation (A) above. As indicated in Table 5, both surfaces of the first lens element L21 of the second lens group G2 are aspheric.

Table 6 below lists the values of the constant K and the aspheric coefficients $A_3$ -$A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E-2" represents the number $1.0 \times 10^{-2}$.

TABLE 6

| # | K | $A_3$ | $A_4$ | $A_5$ | $A_6$ |
|---|---|---|---|---|---|
| 9 | 0.8436294 | 0.4728209E−3 | −0.7156535E−3 | 0.1447493E−3 | −0.8318544E−5 |
| 10 | 2.143404 | 0.5749652E−3 | −0.2671578E−3 | 0.1241330E−3 | 0.1224510E−4 |

TABLE 6-continued

| # | $A_7$ | $A_8$ | $A_9$ | $A_{10}$ |
|---|---|---|---|---|
| 9 | −0.1591019E−5 | −0.6372899E−7 | 0.5908860E−7 | −0.4137393E−8 |
| 10 | −0.8496123E−5 | 0.1101385E−5 | −0.3958868E−7 | −0.6643363E−9 |

In the zoom lens of Embodiment 1-2, both the first lens group G1 and the second lens group G2 move during zooming. Therefore, the on-axis spacings D7, D8, and D16 change with zooming. With zooming, the focal length f, the f-number $F_{NO}$, and the half-field angle ω of the zoom lens also change. Table 7 below lists the values of the focal length f (in mm), the f-number $F_{NO}$, the half-field angle ω (in degrees), and the variables D7, D8, and D16 (in mm) at the wide-angle end (f=2.95 mm) and at the telephoto end (f=7.95 mm) when the zoom lens is focused at infinity.

TABLE 7

| f | $F_{NO}$ | ω | D7 | D8 | D16 |
|---|---|---|---|---|---|
| 2.95 | 0.96 | 62 | 11.93 | 8.00 | 1.00 |
| 7.95 | 1.96 | 22 | 1.84 | 0.71 | 8.30 |

The zoom lens of Embodiment 1-2 of the present invention satisfies Conditions (1)–(4) and Condition (5-1) above as set forth in Table 8 below.

TABLE 8

| Condition No. | Condition | Value |
|---|---|---|
| (1) | 0.5 < |f1/f2| < 0.8 | 0.686 |
| (2) | 2.6 < str/z < 2.9 | 2.703 |
| (3) | $N_{dL14}$ > 1.83 | 1.847 |
| (4) | $N_{dL23}$ > 1.83 | 1.847 |
| (5-1) | $v_{dL21}$ > 60 | 81.5 |

Figure 5A:
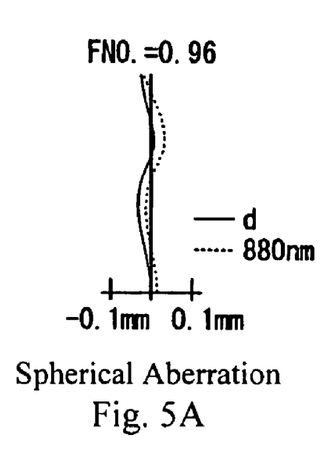
FIGS. 5A–5C show aberrations of Embodiment 1-2 of the zoom lens of the present invention at the wide-angle end.
Figure 5B:
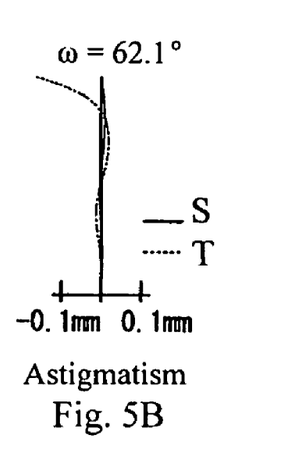
Figure 5C:
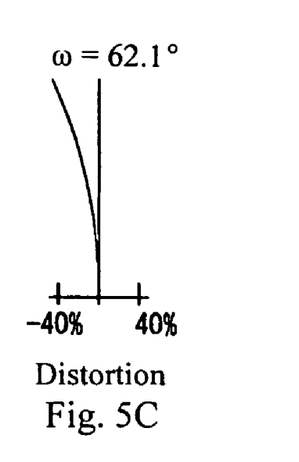
Figure 6A:
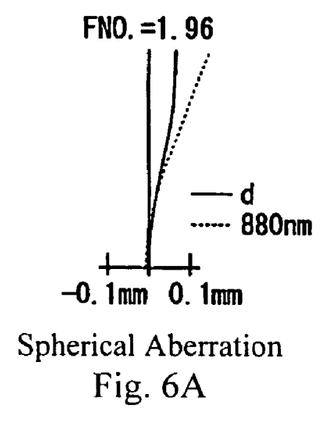
FIGS. 6A–6C show aberrations of Embodiment 1-2 of the zoom lens of the present invention at the telephoto end.
Figure 6B:
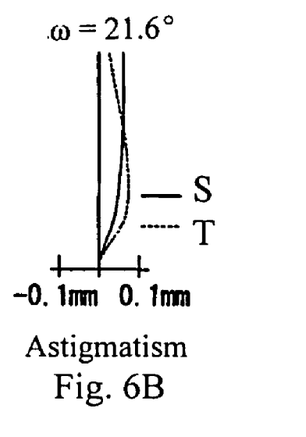
Figure 6C:
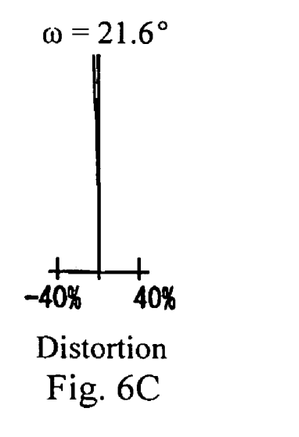

FIGS. 5A–5C show the spherical aberration, astigmatism, and distortion, respectively, of the zoom lens of Embodiment 1-2 at the wide-angle end. FIGS. 6A–6C show the spherical aberration, astigmatism, and distortion, respectively, of the zoom lens of Embodiment 1-2 at the telephoto end. In FIGS. 5A and 6A, the spherical aberration is shown for the wavelengths 587.6 nm (the d-line) and 880 nm. In FIGS. 5B, 5C, 6B, and 6C, ω is the half-field angle. In FIGS. 5B and 6B, the astigmatism is shown for the sagittal image surface S and the tangential image surface T. In FIGS. 5C and 6C, distortion is measured at 587.6 nm (the d-line). As is apparent from these figures, the various aberrations of Embodiment 1-2 are favorably corrected over the entire range of zoom in both the visible light and near-infrared regions despite the compact zoom lens having a relatively low f-number $F_{NO}$.

EMBODIMENT 2-1

Figure 7:
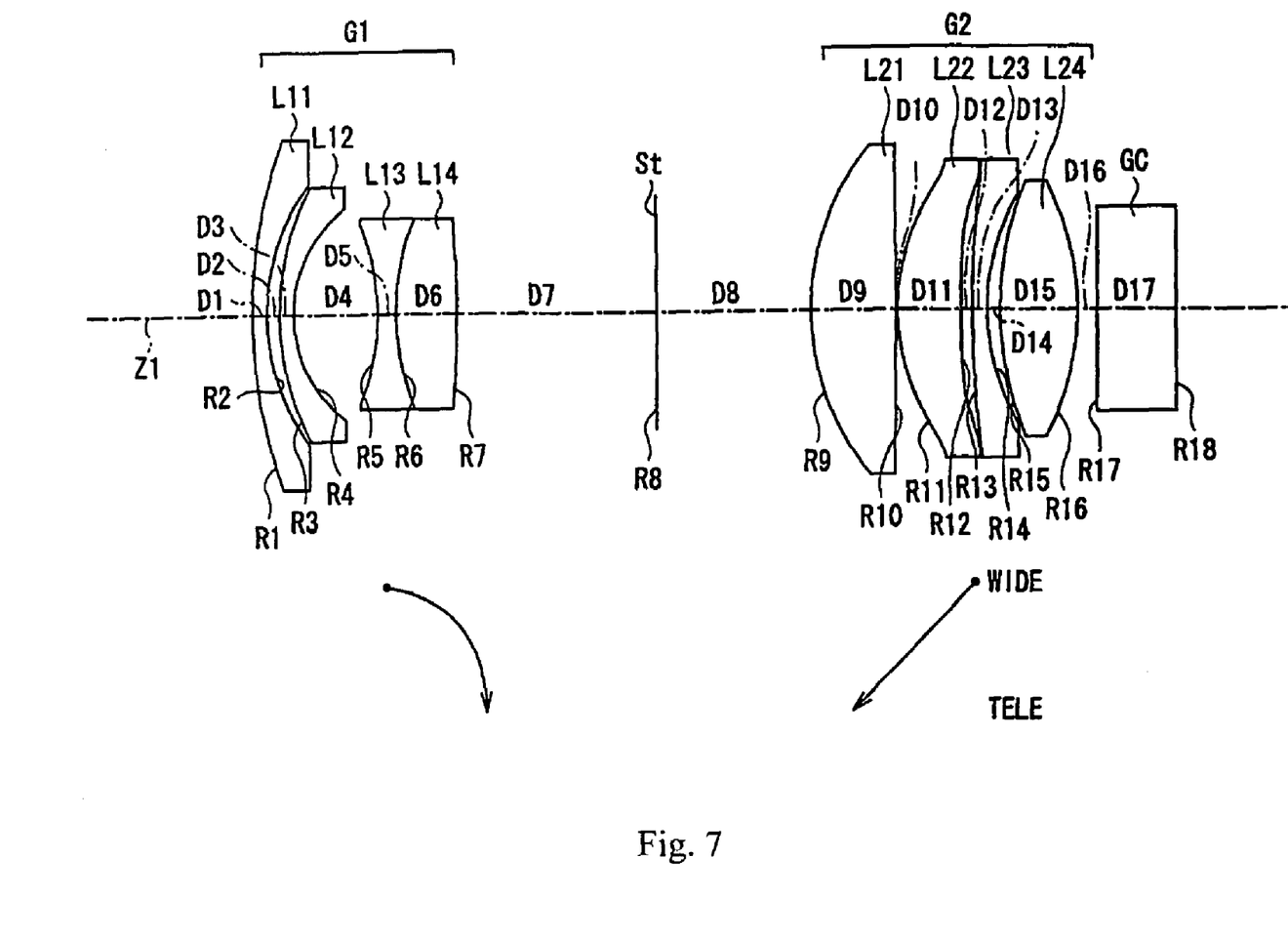
FIG. 7 shows a cross-sectional view of Embodiment 2-1 of the zoom lens of the present invention at the wide-angle end.

FIG. 7 shows a cross-sectional view of Embodiment 2-1 of the zoom lens of the present invention at the wide-angle end. Embodiment 2-1 is very similar to Embodiment 1-1 and therefore only the differences between Embodiment 2-1 and Embodiment 1-1 will be explained. In this zoom lens; spherical aberration that occurs with low f-numbers is easily corrected by the second lens element L22 of the second lens group G2 including an aspheric surface, in particular by both lens surfaces being aspheric, rather than both lens surfaces of the first lens element L21 of the second lens group G2 being aspheric as in Embodiment 1-1 (and Embodiment 1-2). Additionally, the aspheric shape of the image-side surface of the second lens element L22 of the second lens group G2 is such that the curvature C is equal to zero on the optical axis. The curvature C is defined as equal to one divided by the radius of curvature R so that the radius of curvature R is equal to infinity on the optical axis. This defines what would be a planar surface if the radius of curvature R equal to infinity were to hold true off the optical axis. Because the object-side surface of the second lens element L22 of the second lens group G2 in Embodiment 2-1 is convex, the second lens element L22 of the second lens group G2 may be described as a plano-convex lens element on the optical axis, although the plano-convex "shape" actually exists only on the optical axis because the shape of the image-side surface changes from the planar shape off the optical axis according to Equation (A) above.

Additionally, although Embodiment 2-1 satisfies Condition (5-1) above, Embodiment 2-1 is particularly designed to satisfy the following preferable condition, which Embodiments 1-1 and 1-2 above also satisfy:

$$v_{dL22} > 60 \qquad \text{Condition (5-2)}$$

where $v_{dL22}$ is the Abbe number at the d-line (587.6 nm) of the second lens element L22 of the second lens group G2.

In general, Embodiment 2-1 differs from Embodiment 1-1 in its lens element configuration such as different radii of curvature of the lens surfaces, different eccentricities and aspheric coefficients of the aspheric lens surfaces, some different optical element surface spacings, some different refractive indexes, and some different Abbe numbers of the optical materials of the lens elements. Particularly, the radius of curvature of the image-side surface of the first lens element L21 of the second lens group G2 in Embodiment 2-1 is much larger than the on-axis radius of curvature of the image-side surface of the first lens element L21 of the second lens group G2 in Embodiment 1-1 (as well as much larger than the on-axis radius of curvature of the image-side surface of the first lens element L21 of the second lens group G2 in Embodiment 1-2).

Additionally, the first lens element L21 of the second lens group G2 in Embodiment 2-1 has the preferable shape of a biconvex lens element, similar to the aspheric first lens element L21 of the second lens group G2 in each of Embodiments 1-1 and 1-2 above having a biconvex shape at least on-axis.

If an aspheric lens element L22 that satisfies Condition (5-2) is properly selected, axial chromatic aberration over the visible to near-infrared range is satisfactorily corrected. Therefore, a lens suitable for both visible and near-infrared regions can be easily obtained. If the value of Condition (5-2) does not satisfy the lower limit of Condition (5-2), it is very difficult to correct chromatic aberration over the visible to near-infrared regions.

Table 9 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 2-1.

TABLE 9

| # | R | D | $N_d$ | $v_d$ |
|---|---|---|---|---|
| 1 | 22.133 | 0.750 | 1.83481 | 42.7 |
| 2 | 9.805 | 0.649 | | |
| 3 | 12.012 | 0.700 | 1.83481 | 42.7 |
| 4 | 6.059 | 4.356 | | |
| 5 | −10.465 | 0.937 | 1.69895 | 30.1 |
| 6 | 11.461 | 3.132 | 1.92286 | 18.9 |
| 7 | −45.315 | D7 (variable) | | |
| 8 | ∞ (stop) | D8 (variable) | | |
| 9 | 11.483 | 4.281 | 1.62041 | 60.3 |
| 10 | −741.726 | 0.109 | | |
| 11* | 9.777 | 3.277 | 1.49700 | 81.5 |
| 12* | ∞ | 0.571 | | |
| 13 | 51.363 | 0.750 | 1.92286 | 18.9 |
| 14 | 9.948 | 0.678 | | |
| 15 | 14.310 | 3.994 | 1.58913 | 61.2 |
| 16 | −12.079 | D16 (variable) | | |
| 17 | ∞ | 4.000 | 1.51633 | 64.1 |
| 18 | ∞ | | | |

The surfaces with a * to the right of the surface number in Table 9 are aspheric lens surfaces, and the aspheric surface shape is expressed by Equation (A) above. As indicated in Table 9, both surfaces of the second lens element L22 of the second lens group G2 are aspheric.

Table 10 below lists the values of the constant K and the aspherical coefficients $A_3$–$A_{10}$ used in Equation (A) above for each of the aspheric lens surfaces of Table 9. Aspheric coefficients that are not present in Table 10 are zero. An "E" in the data indicates that the number following the "E" is the exponent to the base 10. For example, "1.0E-2" represents the number $1.0 \times 10^{-2}$.

TABLE 10

| # | K | $A_3$ | $A_4$ | $A_5$ | $A_6$ |
|---|---|---|---|---|---|
| 11 | 0.848 | −0.2310907E−3 | −0.2275012E−3 | −0.7438302E−4 | 0.7099849E−5 |
| 12 | −122.222 | −0.2955954E−3 | 0.1114541E−2 | −0.2002991E−3 | 0.3612408E−4 |

| # | $A_7$ | $A_8$ | $A_9$ | $A_{10}$ |
|---|---|---|---|---|
| 11 | 0.2000679E−5 | −0.1989522E−6 | −0.1745600E−7 | −0.8997591E−9 |
| 12 | 0.1808953E−5 | −0.5769186E−6 | −0.4193170E−7 | 0.3452470E−8 |

In the zoom lens of Embodiment 2-1, both the first lens group G1 and the second lens group G2 move during zooming. Therefore, the on-axis spacings D7, D8, and D16 change with zooming. With zooming, the focal length f, the f-number $F_{NO}$, and the half-field angle ω of the zoom lens also change. Table 11 below lists the values of the focal length f (in mm), the f-number $F_{NO}$, the half-field angle ω (in degrees), and the variables D7, D8, and D16 (in mm) at the wide-angle end (f=2.94 mm) and at the telephoto end (f=7.64 mm) when the zoom lens is focused at infinity.

TABLE 11

| f | $F_{NO}$ | ω | D7 | D8 | D16 |
|---|---|---|---|---|---|
| 2.94 | 1.00 | 64 | 10.23 | 7.91 | 1.00 |
| 7.64 | 1.89 | 23 | 1.88 | 0.70 | 8.21 |

The zoom lens of Embodiment 2-1 of the present invention satisfies Conditions (1)–(4) and Condition (5-2) above as set forth in Table 12 below.

TABLE 12

| Condition No. | Condition | Value |
|---|---|---|
| (1) | $0.5 < |f1/f2| < 0.8$ | 0.652 |
| (2) | $2.6 < \text{str}/z < 2.9$ | 2.772 |
| (3) | $N_{dL14} > 1.83$ | 1.92286 |
| (4) | $N_{dL23} > 1.83$ | 1.92286 |
| (5-2) | $v_{dL22} > 60$ | 81.5 |

Figure 8A:
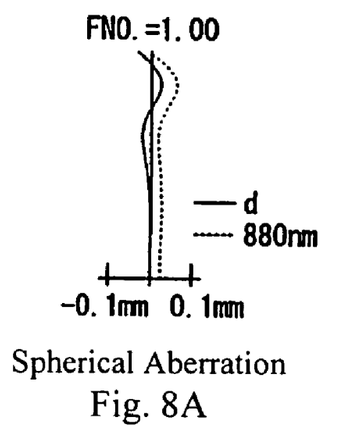
FIGS. 8A–8C show aberrations of Embodiment 2-1 of the zoom lens of the present invention at the wide-angle end.
Figure 8B:
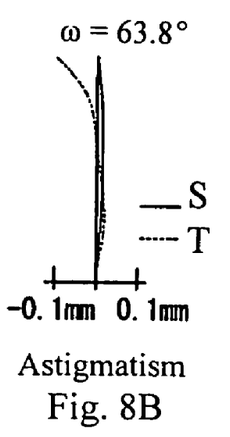
Figure 8C:
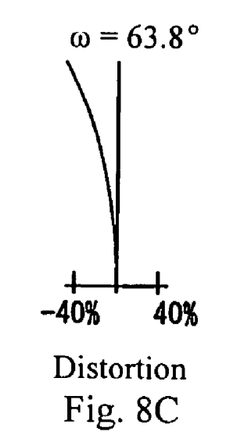
Figure 9A:
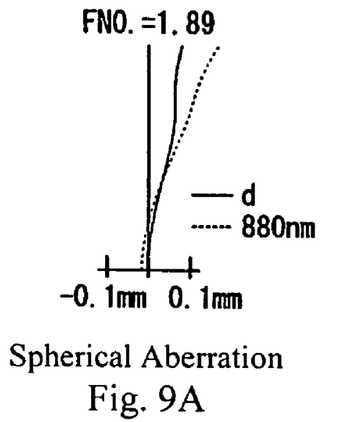
FIGS. 9A–9C show aberrations of Embodiment 2-1 of the zoom lens of the present invention at the telephoto end.
Figure 9B:
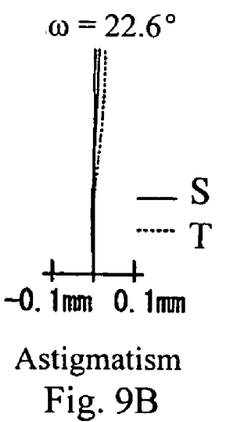
Figure 9C:
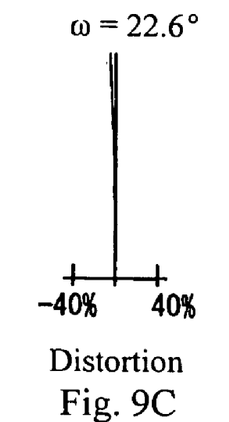

FIGS. 8A–8C show the spherical aberration, astigmatism, and distortion, respectively, of the zoom lens of Embodiment 2-1 at the wide-angle end. FIGS. 9A–9C show the spherical aberration, astigmatism, and distortion, respectively, of the zoom lens of Embodiment 2-1 at the telephoto end. In FIGS. 8A and 9A, the spherical aberration is shown for the wavelengths 587.6 nm (the d-line) and 880 nm. In FIGS. 8B, 8C, 9B, and 9C, (ω is the half-field angle. In FIGS. 8B and 9B, the astigmatism is shown for the sagittal image surface S and the tangential image surface T. In FIGS. 8C and 9C, distortion is measured at 587.6 nm (the d-line). As is apparent from these figures, the various aberrations of Embodiment 2-1 are favorably corrected over the entire range of zoom in both the visible light and near-infrared regions despite the compact zoom lens having a relatively low f-number $F_{NO}$.

EMBODIMENT 2-2

Figure 10:
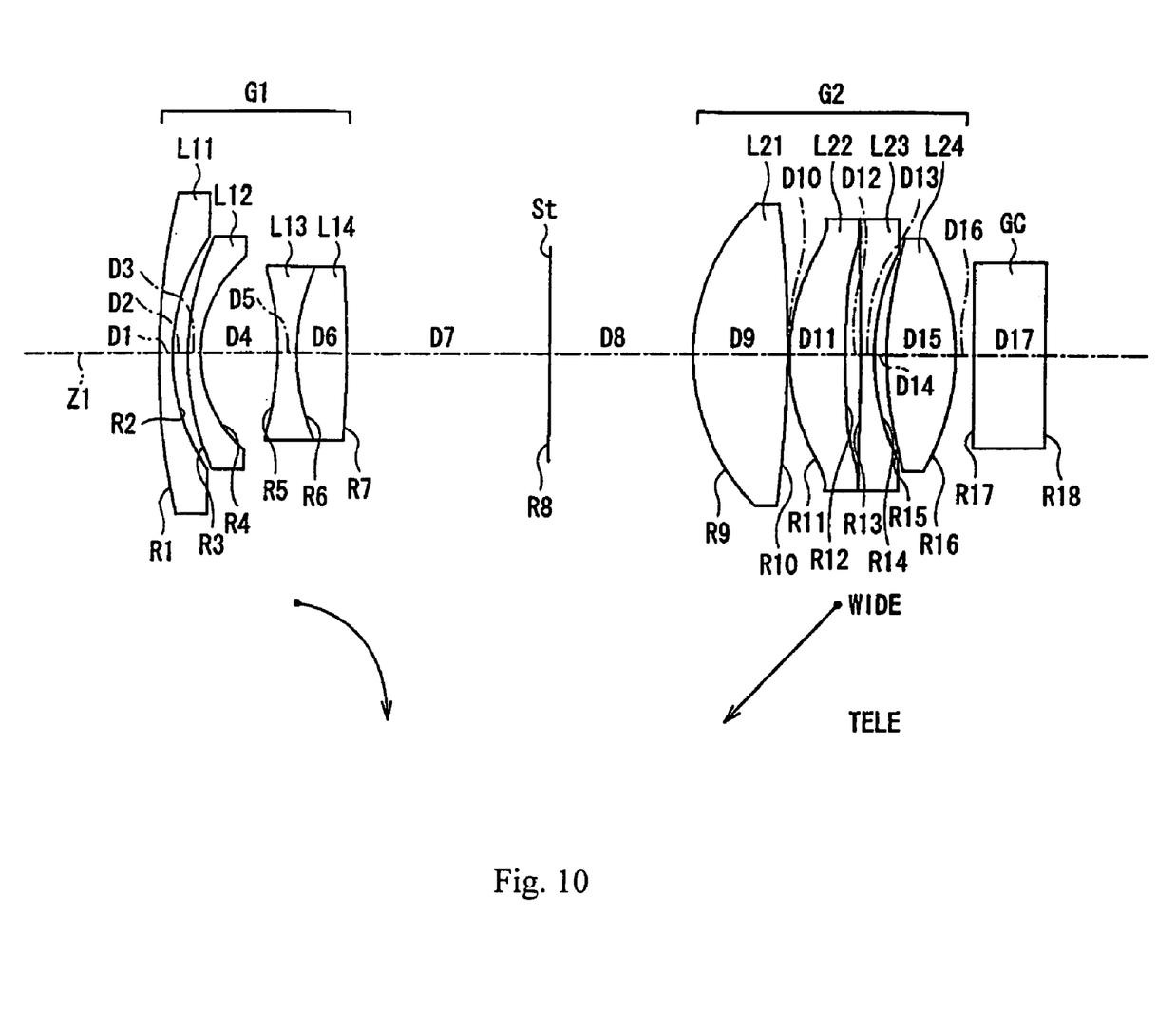
FIG. 10 shows a cross-sectional view of Embodiment 2-2 of the zoom lens of the present invention at the wide-angle end.

FIG. 10 shows a cross-sectional view of Embodiment 2-2 of the zoom lens of the present invention at the wide-angle end. Embodiment 2-2 is very similar to Embodiment 2-1 and therefore only the differences between Embodiment 2-2 and Embodiment 2-1 will be explained. Embodiment 2-2 differs from Embodiment 2-1 in its lens element configuration such as different radii of curvature, of the lens surfaces, different eccentricities and aspheric coefficients of the aspheric lens surfaces, some different optical element surface spacings, some different refractive indexes, and some different Abbe numbers of the optical materials of the lens elements. In particular, in Embodiment 2-2, the object-side surface of third lens element L23 of the second lens group G2 is concave rather than convex as in Embodiment 2-1 so that the third lens element L23 is a biconcave lens element in Embodiment 2-2 rather than a meniscus lens element as in Embodiment 2-1 (as well as in Embodiments 1-1 and 1-2).

Table 13 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 2-2.

TABLE 13

| # | R | D | $N_d$ | $v_d$ |
|---|---|---|---|---|
| 1 | 33.317 | 0.750 | 1.83400 | 37.2 |
| 2 | 10.087 | 0.855 | | |
| 3 | 13.533 | 0.700 | 1.83400 | 37.2 |
| 4 | 6.363 | 4.256 | | |
| 5 | −14.084 | 1.064 | 1.69895 | 30.1 |
| 6 | 10.468 | 2.842 | 1.92286 | 18.9 |
| 7 | −58.890 | D7 (variable) | | |
| 8 | ∞ (stop) | D8 (variable) | | |
| 9 | 10.230 | 5.324 | 1.48749 | 70.2 |
| 10 | −54.617 | 0.100 | | |
| 11* | 10.274 | 3.124 | 1.58913 | 61.2 |
| 12* | ∞ | 0.793 | | |
| 13 | −276.785 | 0.750 | 1.92286 | 18.9 |
| 14 | 11.659 | 0.682 | | |
| 15 | 19.082 | 3.802 | 1.58913 | 61.2 |
| 16 | −11.255 | D16 (variable) | | |
| 17 | ∞ | 4.000 | 1.51633 | 64.1 |
| 18 | ∞ | | | |

The surfaces with a * to the right of the surface number in Table 13 are aspheric lens surfaces, and the aspheric surface shape is expressed by Equation (A) above. As indicated in Table 13, both surfaces of the second lens element L22 of the second lens group G2 are aspheric.

Table 14 below lists the values of the constant K and the aspherical coefficients $A_3$-$A_{10}$ used in Equation (A) above for each of the aspheric lens surfaces of Table 13. Aspheric coefficients that are not present in Table 14 are zero. An "E" in the data indicates that the number following the "E" is the exponent to the base 10. For example, "1.0E-2" represents the number $1.0 \times 10^{-2}$.

TABLE 14

| # | K | $A_3$ | $A_4$ | $A_5$ | $A_6$ |
|---|---|---|---|---|---|
| 11 | 0.9096283 | −0.2782870E−3 | 0.3042504E−3 | −0.8593563E−4 | 0.6829582E−5 |
| 12 | −122.2300786 | −0.4038494E−3 | 0.1130303E−2 | −0.2087437E−3 | 0.3527649E−4 |

| # | $A_7$ | $A_8$ | $A_9$ | $A_{10}$ |
|---|---|---|---|---|
| 11 | 0.2018911E−5 | −0.1947234E−6 | −0.2039004E−7 | −0.1691770E−8 |
| 12 | 0.1626573E−5 | −0.5958696E−6 | −0.4149633E−7 | 0.3779334E−8 |

In the zoom lens of Embodiment 2-2, both the first lens group G1 and the second lens group G2 move during zooming. Therefore, the on-axis spacings D7, D8, and D16 change with zooming. With zooming, the focal length f, the f-number $F_{NO}$, and the half-field angle ω of the zoom lens also change. Table 15 below lists the values of the focal length f (in mm), the f-number $F_{NO}$, the half-field angle ω (in degrees), and the variables D7, D8, and D16 (in mm) at the wide-angle end (f=2.93 mm) and at the telephoto end (f=7.63 mm) when the zoom lens is focused at infinity.

TABLE 15

| f | $F_{NO}$ | ω | D7 | D8 | D16 |
|---|---|---|---|---|---|
| 2.93 | 1.03 | 64 | 11.26 | 8.01 | 1.00 |
| 7.63 | 1.94 | 23 | 1.83 | 0.70 | 8.31 |

The zoom lens of Embodiment 2-2 of the present invention satisfies Conditions (1)–(4) and (5-2) above as set forth in Table 16 below.

TABLE 16

| Condition No. | Condition | Value |
|---|---|---|
| (1) | 0.5 < |f1/f2| < 0.8 | 0.642 |
| (2) | 2.6 < str/z < 2.9 | 2.811 |
| (3) | $N_{dL14} > 1.83$ | 1.92286 |
| (4) | $N_{dL23} > 1.83$ | 1.92286 |
| (5-2) | $v_{dL22} > 60$ | 61.2 |

Figure 11A:
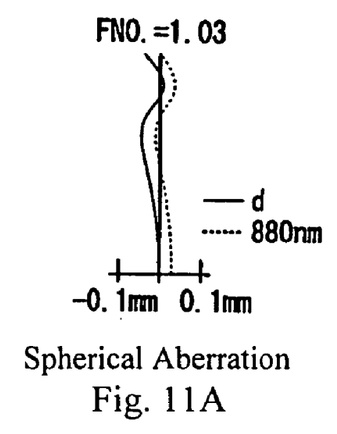
FIGS. 11A–11C show aberrations of Embodiment 2-2 of the zoom lens of the present invention at the wide-angle end.
Figure 11B:
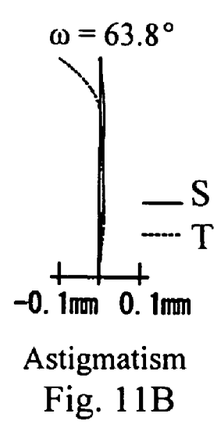
Figure 11C:
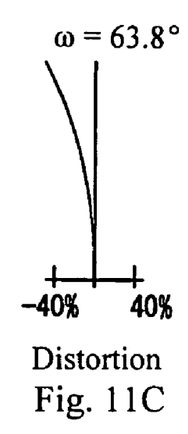
Figure 12A:
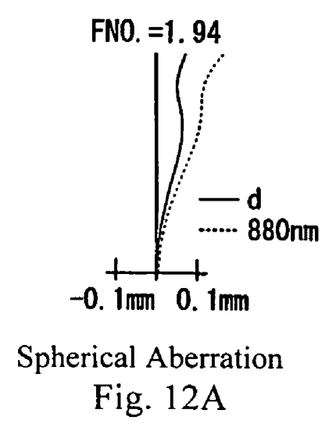
FIGS. 12A–12C show aberrations of Embodiment 2-2 of the zoom lens of the present invention at the telephoto end.
Figure 12B:
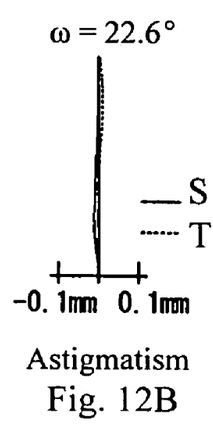
Figure 12C:
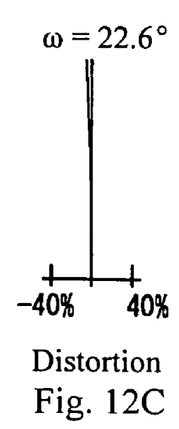

FIGS. 11A–11C show the spherical aberration, astigmatism, and distortion, respectively, of the zoom lens of Embodiment 2-2 at the wide-angle end. FIGS. 12A–12C show the spherical aberration, astigmatism, and distortion, respectively, of the zoom lens of Embodiment 2-2 at the telephoto end. In FIGS. 11A and 12A, the spherical aberration is shown for the wavelengths 587.6 nm (the d-line) and 880 nm. In FIGS. 11B, 11C, 12B, and 12C, ω is the half-field angle. In FIGS. 11B and 12B, the astigmatism is shown for the sagittal image surface S and the tangential image surface T. In FIGS. 11C and 12C, distortion is measured at 587.6 nm (the d-line). As is apparent from these figures, the various aberrations of Embodiment 2-2 are favorably corrected over the entire range of zoom in both the visible light and near-infrared regions despite the compact zoom lens having a relatively low f-number $F_{NO}$.

The present invention is not limited to the aforementioned embodiments, as it will be obvious that various alternative implementations are possible. For instance, values such as the radius of curvature R of each of the lens components, the surface spacings D, the refractive index N, as well as the Abbe number v, are not limited to the examples indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens comprising, arranged along an optical axis in order from the object side as follows:
   a first lens group having negative refractive power; and
   a second lens group having positive refractive power;
   wherein
   during zooming from the wide-angle end to the telephoto end, the first lens group moves along the optical axis toward the image side and the second lens group moves along the optical axis toward the object side;

and the following conditions are satisfied:

$0.5 < |f1/f2| < 0.8$ $2.6 < str/z < 2.9$ where
- f1 is the focal length of the first lens group,
- f2 is the focal length of the second lens group,
- str is the distance that the second lens group moves along the optical axis during zooming from the wide-angle end to the telephoto end, and
- z is the zoom ratio of the zoom lens, defined as the focal length at the telephoto end divided by the focal length at the wide-angle end.

2. The zoom lens of claim 1, wherein the zoom lens includes only two lens groups.

3. The zoom lens of claim 1, wherein:
the first lens group consists of, arranged along the optical axis in order from the object side, a first lens component having negative refractive power that consists of a lens element, a second lens component having negative refractive power that consists of a lens element, and a third lens component that consists of, arranged in order from the object side, a third lens element having negative refractive power and a fourth lens element having positive refractive power; and
the second lens group consists of, arranged along the optical axis in order from the object side, a first lens component having positive refractive power that consists of a lens element having at least one aspheric surface, a second lens component having positive refractive power that consists of a lens element, a third lens component having negative refractive power that consists of a lens element, and a fourth lens component having positive refractive power.

4. The zoom lens of claim 3, wherein the zoom lens includes only two lens groups.

5. The zoom lens of claim 3, wherein:
each of the first and second lens components of the first lens group consists of a meniscus lens element having its convex surface on the object side; and
the third lens component of the first lens group consists of a biconcave lens element.

6. The zoom lens of claim 4, wherein:
each of the first and second lens components of the first lens group consists of a meniscus lens element having its convex surface on the object side; and
the third lens component of the first lens group consists of a biconcave lens element.

7. The zoom lens of claim 3, wherein the third lens component of the second lens group consists of a meniscus lens element having its convex surface on the object side.

8. The zoom lens of claim 4, wherein the third lens component of the second lens group consists of a meniscus lens element having its convex surface on the object side.

9. The zoom lens of claim 3, wherein the following conditions are satisfied:

$N_{dL14} > 1.83$ $N_{dL23} > 1.83$ $\nu_{dL21} > 60$ where
- $N_{dL14}$ is the index of refraction at the d-line of the fourth lens element of the first lens group,
- $N_{dL23}$ is the index of refraction at the d-line of the third lens component of the second lens group, and
- $\nu_{dL21}$ is the Abbe number at the d-line of the first lens component of the second lens group.

10. The zoom lens of claim 4, wherein the following conditions are satisfied:

$N_{dL14} > 1.83$ $N_{dL23} > 1.83$ $\nu_{dL21} > 60$ where
- $N_{dL14}$ is the index of refraction at the d-line of the fourth lens component of the first lens group
- $N_{dL23}$ is the index of refraction at the d-line of the third lens component of the second lens group, and
- $\nu_{dL21}$ is the Abbe number at the d-line of the first lens component of the second lens group.

11. A zoom lens comprising, arranged along an optical axis in order from the object side as follows:
a first lens group having negative refractive power; and
a second lens group having positive refractive power;
wherein
during zooming from the wide-angle end to the telephoto end, the first lens group moves along the optical axis toward the image side and the second lens group moves along the optical axis toward the object side;
the first lens group consists of, arranged along the optical axis in order from the object side, a first lens component having negative refractive power that consists of a lens element, a second lens component having negative refractive power that consists of a lens element, and a third lens component that consists of, arranged in order from the object side, a third lens element having negative refractive power and a fourth lens element having positive refractive power;
the second lens group consists of, arranged along the optical axis in order from the object side, a first lens component having positive refractive power that consists of a lens element, a second lens component having positive refractive power that consists of a lens element having at least one aspheric surface, a third lens component having negative refractive power that consists of a lens element, and a fourth lens component having positive refractive power that consists of a lens element; and
the following conditions are satisfied:

$0.5 < |f1/f2| < 0.8$ $2.6 < str/z < 2.9$ where
- f1 is the focal length of the first lens group,
- f2 is the focal length of the second lens group,
- str is the distance that the second lens group moves along the optical axis during zooming from the wide-angle to the telephoto end, and
- z is the zoom ratio of the zoom lens, defined as the focal length at the telephoto end divided by the focal length at the wide-angle end.

12. The zoom lens of claim 11, wherein the zoom lens includes only two lens groups.

13. The zoom lens of claim 11, wherein:
each of he first and second lens components of the first lens group consists of a meniscus lens element having its convex surface on the object side; and
the third lens element of the first lens group consists of a biconcave lens element.

14. The zoom lens of claim 12, wherein:
each of the first and second lens components of the first lens group consists of a meniscus lens element having its convex surface on the object side; and
the third lens element of the first lens group consists of a biconcave lens element.

15. The zoom lens of claim 11, wherein the third lens component of the second lens group consists of a meniscus lens element having its convex surface on the object side.

16. The zoom lens of claim 12, wherein the third lens component of the second lens group consists of a meniscus lens element having its convex surface on the object side.

17. The zoom lens of claim 11, wherein the following conditions are satisfied:

$$N_{dL14} > 1.83$$

$$N_{dL23} > 1.83$$

$$v_{dL22} > 60$$

where
$N_{dL14}$ is the index of refraction at the d-line of the fourth lens element of the first lens group,
$N_{dL23}$ is the index of refraction at the d-line of the third lens component of the second lens group, and
$v_{dL22}$ is the Abbe number at the d-line of the second lens component of the second lens group.

18. The zoom lens of claim 12, wherein the following conditions are satisfied:

$$N_{dL14} > 1.83$$

$$N_{dL23} > 1.83$$

$$v_{dL22} > 60$$

where
$N_{dL14}$ is the index of refraction at the d-line of the fourth lens element of the first lens group,
$N_{dL23}$ is the index of refraction at the d-line of the third lens component of the second lens group, and
$v_{dL22}$ is the Abbe number at the d-line of the second lens component of the second lens group.

19. The zoom lens of claim 13, wherein the following conditions are satisfied:

$$N_{dL14} > 1.83$$

$$N_{dL23} > 1.83$$

$$v_{dL22} > 60$$

where
$N_{dL14}$ is the index of refraction at the d-line of the fourth lens element of the first lens group,
$N_{dL23}$ is the index of refraction at the d-line of the third lens component of the second lens group, and
$v_{dL22}$ is the Abbe number at the d-line of the second lens component of the second lens group.

20. The zoom lens of claim 14, wherein the following conditions are satisfied:

$$N_{dL14} > 1.83$$

$$N_{dL23} > 1.83$$

$$v_{dL22} > 60$$

where
$N_{dL14}$ is the index of refraction at the d-line of the fourth lens element of the first lens group,
$N_{dL23}$ is the index of refraction at the d-line of the third lens component of the second lens group, and
$v_{dL22}$ is the Abbe number at the d-line of the second lens component of the second lens group.

* * * * *

UNITED STATES PATENT AND TRADEMARK OFFICE
CERTIFICATE OF CORRECTION

PATENT NO. : 6,989,941 B2  Page 1 of 1
DATED : January 24, 2006
INVENTOR(S) : Tomioka It is certified that error appears in the above-identified patent and that said Letters Patent is hereby corrected as shown below:

Column 3,
Line 52, change "is known is herein" to -- is herein --;

Column 9,
Line 63, change "In this zoom lens;" to -- In this zoom lens, --;

Column 12,
Line 21, change "($\omega$" to -- $\omega$ --;
Line 52, change "curvature," to -- curvature --; and Column 16,
Line 63, change "of he" to -- of the --.

Signed and Sealed this

Eighteenth Day of April, 2006

JON W. DUDAS
*Director of the United States Patent and Trademark Office*